G. BOUTON.
SPEED REDUCING GEAR.
APPLICATION FILED DEC. 10, 1917.

1,311,310.

Patented July 29, 1919.
2 SHEETS—SHEET 1.

Inventor.

G. BOUTON.
SPEED REDUCING GEAR.
APPLICATION FILED DEC. 10, 1917.

1,311,310.

Patented July 29, 1919.
2 SHEETS—SHEET 2.

Inventor.

UNITED STATES PATENT OFFICE.

GEORGES BOUTON, OF PARIS, FRANCE, ASSIGNOR TO ETABLISSEMENTS DE DION BOUTON, SOCIÉTÉ ANONYME, OF PUTEAUX, FRANCE, A CORPORATION OF FRANCE.

SPEED-REDUCING GEAR.

1,311,310.     Specification of Letters Patent.     Patented July 29, 1919.

Application filed December 10, 1917. Serial No. 206,516.

*To all whom it may concern:*

Be it known that I, GEORGES BOUTON, engineer, of 8 Avenue des Ternes, at Paris, Department of the Seine, France, citizen of the French Republic, have invented certain new and useful Improvements in or Relating to Speed-Reducing Gears; and I do hereby declare the following to be a full, clear, and exact description of the invention, such as will enable others skilled in the art to which it appertains to make and use the same.

This invention relates to speed reducing gear, more particularly intended for road vehicles traveling at a low speed. The reduction of speed obtained is very great, owing to the use of differential planet wheels imparting a very slow movement of rotation to the rim of the wheel. This device has the advantage of enabling the gear parts generally employed to be used on the chassis of the vehicle, owing to the great reduction obtained in the wheel. Another object of the invention is to provide a construction easy to lubricate, and to that end the two cheeks of the wheel are provided with plates or covers, one of which, the outer plate, comprises a ball bearing which guides and centers the end of the driving shaft. The planet wheel carrier which is driven by the engine shaft, is supported and centered on a roller bearing mounted between the hub of the said carrier and the hub of the fixed rim forming a reaction wheel for the series of differential pinions.

A construction according to the invention is illustrated by way of example in the accompanying drawing.

Figure 1:
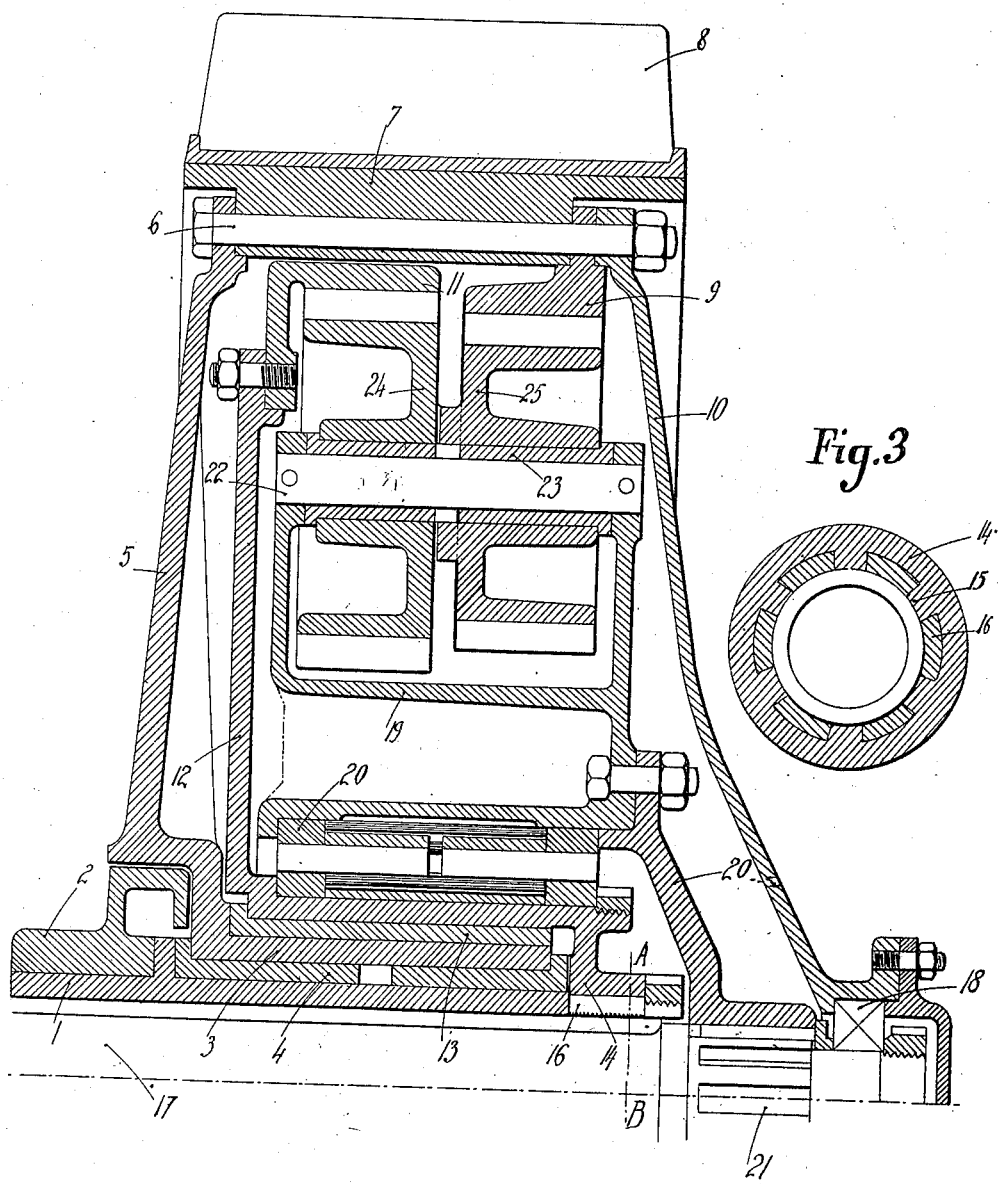
Figure 2:
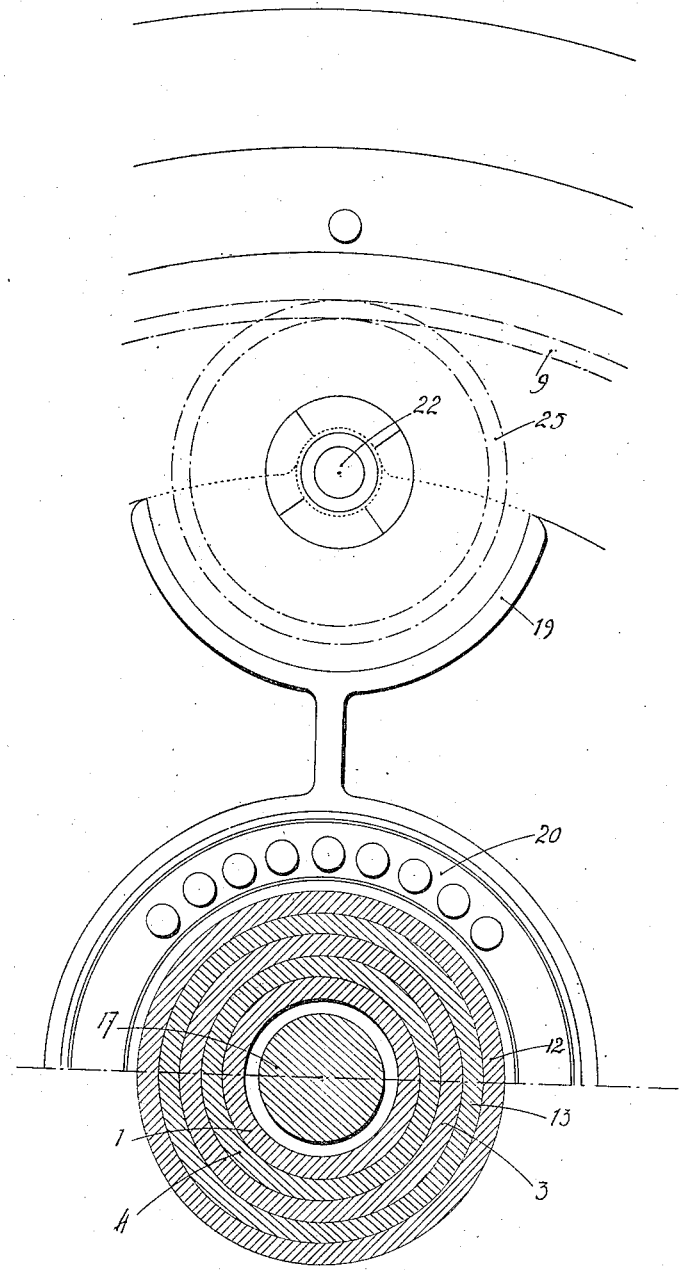

Figure 1 is an axial section of the wheel; Fig. 2 is a cross-section of the wheel and Fig. 3 is a section on line A—B in Fig. 1.

The wheel is carried on the hollow spindle 1 mounted in the sleeve 2, and rotates with its hub 3 on a brass bearing 4. The hub 3 is provided with a cheek 5 to which is secured, by bolts 6, the rim 7 of the wheel receiving the tire 8. The driving circular rack 9 is held between the rim 7 and an outer cheek 10 by means of the bolts 6.

The circular rack 11 is mounted on a fixed cheek 12 centered on the hub 3 of the wheel on a brass bearing 13. The cheek 12 carries a hub 14 provided with keys 15 engaging with grooves 16 provided in the hollow spindle 1. The cheek 12 is therefore locked so as to enable the fixed wheel 4 to play the part of a reaction wheel.

The driving shaft 17 passes through the interior of the hollow spindle 1, it is carried at its end on a ball bearing 18 supported in a recess of the outer cheek 10.

The planet wheel carrier 19 is mounted on the hub of the fixed cheek 12 on a roller bearing 20 of great length, of a type similar to that described in the French patent Serial No. 87,140 of the 10 November 1916 or of any other suitable type of bearing. The driving of the planet carrier 19 is effected by means of the sleeve 20 secured by bolts and provided with grooves engaging with a corresponding grooved part 21 of the driving shaft 17. The planet wheel carrier 19 comprises cages each of which has two lateral walls forming a support for pins 22 provided with brass bushes 23 on which the planet wheels 24 and 25 rotate and engage respectively with the fixed rack 11 and the movable rack 9. The movement imparted by the driving shaft 17 is transmitted to the planet carrier 19 which rotates on the roller bearing 20. The planet wheel 24 engaging with the fixed rack 11, rotates and drives the adjoining planet wheel 25. The latter therefore tends to drive the movable rack 9 in the direction opposite to that of the movement imparted by the planet wheel carrier 19. The differential action due to these movements in opposite directions, rotates the rim of the wheel with the reduced speed desired. By giving suitable dimensions to planet wheels 24 and 25, it is possible to obtain a considerable reduction in speed, which makes it possible to reduce, even for a high power, the dimensions of the devices transmitting movement to the wheels.

I claim—

1. A speed reducing gear comprising a power shaft, a cage rotatable with said shaft, a bearing for said cage, means for securing the cage to the shaft, planet wheels supported by the cage, a stationary rack with which one of said wheels engages, and a rack adapted to be secured to a road wheel and with which the other of said wheels engages.

2. A speed reducing gear comprising a hollow spindle, a pair of bearings thereon, a cheek mounted between said bearings, a power shaft, a stationary cheek, a rack carried by the last mentioned cheek, a rack adapted to be secured to a road wheel, a cage secured to the power shaft, and planet wheels carried by the cage and engaging the racks.

3. A speed reducing gear comprising a hollow spindle, a pair of bearings thereon, a cheek mounted between said bearings, a power shaft, a stationary cheek, a rack carried by the last mentioned cheek, a rack adapted to be secured to a road wheel, a cage secured to the power shaft, and planet wheels carried by the cage and engaging the racks, said last mentioned cheek having ball bearings for centering the end of the power shaft.

4. A speed reducing gear comprising a power shaft, a cage rotatable with the power shaft, a stationary cheek, a rack carried thereby, a rack adapted to be secured to a road wheel, planet wheels carried by the cage and engaging the racks, and a bearing for the cage mounted on the aforementioned cheek.

In testimony whereof I affix my signature, in presence of two witnesses.

GEORGES BOUTON.

Witnesses:
  CHAS. P. PRESSLY,
  ALEXANDER BERTHOLLE.

Copies of this patent may be obtained for five cents each, by addressing the "Commissioner of Patents, Washington, D. C."